(12) United States Patent
Neerukonda et al.

(10) Patent No.: US 11,288,901 B2
(45) Date of Patent: Mar. 29, 2022

(54) VEHICLE IMPACT DETECTION

(71) Applicant: Ford Global Technologies, LLC, Dearborn, MI (US)

(72) Inventors: Chandana Neerukonda, Detroit, MI (US); Mostafa Parchami, Dearborn, MI (US); Krithika Swaminathan, Dearborn, MI (US); Mahrdad Damsaz, Dexter, MI (US)

(73) Assignee: FORD GLOBL TECHNOLOGIES, LLC, Dearborn, MI (US)

( * ) Notice: Subject to any disclaimer, the term of this patent is extended or adjusted under 35 U.S.C. 154(b) by 300 days.

(21) Appl. No.: 16/662,359

(22) Filed: Oct. 24, 2019

(65) Prior Publication Data

US 2021/0125430 A1 Apr. 29, 2021

(51) Int. Cl.
| | |
|---|---|
| G07C 5/08 | (2006.01) |
| G07C 5/00 | (2006.01) |
| B60R 21/0136 | (2006.01) |
| G01S 19/13 | (2010.01) |

(52) U.S. Cl.
CPC ........ *G07C 5/0808* (2013.01); *B60R 21/0136* (2013.01); *G01S 19/13* (2013.01); *G07C 5/008* (2013.01); *G07C 5/0816* (2013.01)

(58) Field of Classification Search
CPC .... G07C 5/0808; G07C 5/008; G07C 5/0816; B60R 21/0136; G01S 19/13

USPC ........................................................ 701/29.1
See application file for complete search history.

(56) References Cited

U.S. PATENT DOCUMENTS

| | | | |
|---|---|---|---|
| 7,348,895 B2 | 3/2008 | Lagassey | |
| 9,646,428 B1 | 5/2017 | Konrardy et al. | |
| 9,805,601 B1 * | 10/2017 | Fields | ..................... B60T 17/22 |
| 9,809,159 B1 | 11/2017 | Snyder et al. | |
| 9,832,241 B1 * | 11/2017 | Hayward | ................. G01S 19/50 |
| 9,836,963 B1 | 12/2017 | Hayward | |
| 10,043,323 B1 | 8/2018 | Konrardy et al. | |
| 10,134,278 B1 | 11/2018 | Konrardy et al. | |
| 10,216,194 B1 | 2/2019 | Hayward | |
| 10,643,285 B1 * | 5/2020 | Tofte | ................... G06Q 30/0265 |
| 2020/0062203 A1 * | 2/2020 | Westover | ............ B60R 21/0136 |

* cited by examiner

*Primary Examiner* — Gertrude Arthur Jeanglaude
(74) *Attorney, Agent, or Firm* — Frank A. MacKenzie; Bejin Bieneman PLC (57) ABSTRACT

Detection of an impact to a vehicle is based on data received from one of (a) one or more infrastructure sensors included in an infrastructure element or (b) the vehicle. Verification of the impact is determined by determining that data received from the other of the infrastructure sensors or the vehicle (a) detects the impact and is verified or (b) does not detect the impact and is unverified. A message is transmitted to the vehicle including the verification of the impact and one of (a) a request to operate to a predetermined location based on the impact being verified or (b) a notification to continue a current operation based on the impact being unverified.

20 Claims, 3 Drawing Sheets

VEHICLE IMPACT DETECTION

BACKGROUND

Vehicle impacts can impair vehicle operation and/or give rise to repair and/or maintenance needs. Vehicle impacts may be detected based on vehicle sensor data, e.g., indicating deployment of one or more restraint systems in the vehicle.

DETAILED DESCRIPTION

A system includes a computer including a processor and a memory, the memory storing instructions executable by the processor to detect an impact to a vehicle based on data received from one of (a) one or more infrastructure sensors included in an infrastructure element or (b) the vehicle. The instructions further include instructions to determine a verification of the impact by determining that data received from the other of the infrastructure sensors or the vehicle (a) detects the impact and is verified or (b) does not detect the impact and is unverified. The instructions further include instructions to then transmit a message to the vehicle including the verification of the impact and one of (a) a request to operate to a predetermined location based on the impact being verified or (b) a notification to continue a current operation based on the impact being unverified.

The instructions can further include instructions to, upon receiving a response from the vehicle indicating the vehicle is inoperable, transmit a message indicating a location of the vehicle to a second vehicle.

The instructions can further include instructions to, upon receiving a response from the vehicle indicating the vehicle is operable, determine the vehicle is one of operable or inoperable based on data received from the infrastructure sensors indicating movement of the vehicle.

The instructions can further include instructions to, upon determining the vehicle is inoperable, transmit a message indicating a location of the vehicle to a second vehicle.

Detecting the impact can be determined by data from one of the infrastructure sensors or the vehicle detecting an object within a distance of the vehicle.

Detecting the impact can be determined by data from the infrastructure sensors detecting an anomaly on an exterior of the vehicle.

The instructions can further include instructions to determine the verification of the impact further by determining data received from a user device (a) detects the impact and is verified or (b) does not detect the impact and is unverified.

The instructions can further include instructions to determine the verification of the impact further by determining data received from a second vehicle (a) detects the impact and is verified or (b) does not detect the impact and is unverified.

Determining the verification of the impact can include obtaining the verification as output from a neural network.

The instructions can further include instructions to input the data received from infrastructure sensors and the vehicle into the neural network.

The data can be image data indicating at least one of an object within a distance of the vehicle and an anomaly on an exterior of the vehicle.

A method includes detecting an impact to a vehicle based on data received from one of (a) one or more infrastructure sensors included in an infrastructure element or (b) the vehicle. The method further includes determining a verification of the impact by determining that data received from the other of the infrastructure sensors or the vehicle (a) detects the impact and is verified or (b) does not detect the impact and is unverified. The method further includes then transmitting a message to the vehicle including the verification of the impact and one of (a) a request to operate to a predetermined location based on the impact being verified or (b) a notification to continue a current operation based on the impact being unverified.

The method can include, upon receiving a response from the vehicle indicating the vehicle is inoperable, transmitting a message indicating a location of the vehicle to a second vehicle.

The method can include, upon receiving a response from the vehicle indicating the vehicle is operable, determining the vehicle is one of operable or inoperable based on data received from the infrastructure sensors indicating movement of the vehicle.

The method can include, upon determining the vehicle is inoperable, transmitting a message indicating a location of the vehicle to a second vehicle.

Detecting the impact can be determined by data from one of the infrastructure sensors or the vehicle detecting an object within a distance of the vehicle.

Detecting the impact can be determined by data from the infrastructure sensors detecting an anomaly on an exterior of the vehicle.

Determining the verification of the impact can include obtaining the verification as output from a neural network The method can include inputting the data received from infrastructure sensors and the vehicle into the neural network.

The data can be image data indicating at least one of an object within a distance of the vehicle and an anomaly on an exterior of the vehicle.

Further disclosed herein is a computing device programmed to execute any of the above method steps. Yet further disclosed herein is a computer program product, including a computer readable medium storing instructions executable by a computer processor, to execute an of the above method steps.

Figure 1:
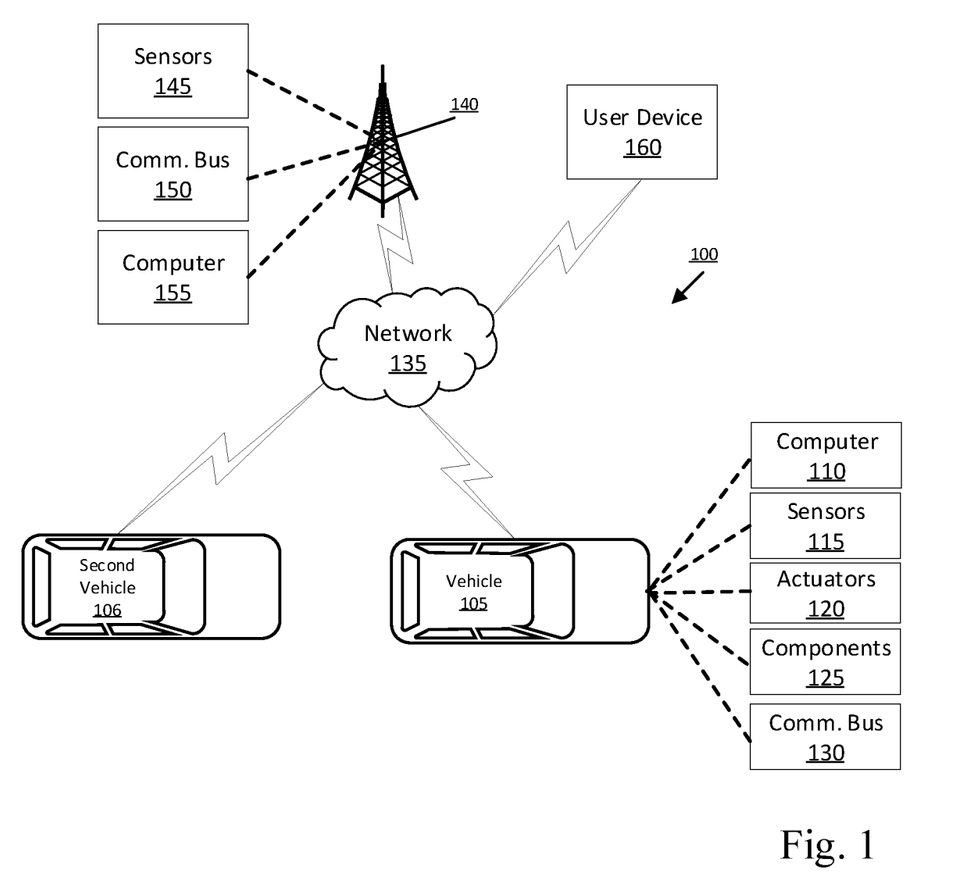
FIG. 1 is a block diagram illustrating an example vehicle impact detection system.

FIG. 1 is a block diagram illustrating an example vehicle impact detection system 100 including an infrastructure element 140 and a vehicle 105. The infrastructure element 140 includes a computer 155 programmed to detect an impact to the vehicle 105 based on data received from one of (a) one or more infrastructure sensors 145 included in the infrastructure element 140 or (b) the vehicle 105. The computer 155 is further programmed then to determine a verification of the impact by determining that data received from the other of the infrastructure sensor(s) 145 or the vehicle 105 (a) detects the impact which is then verified or (b) does not detect the impact which is then unverified. The computer 155 is further programmed to transmit a message to the vehicle 105 including the verification of the impact and one of (a) a request to operate to a predetermined location based on the impact being verified or (b) a notification to continue a current operation based on the impact being unverified.

The vehicle 105, e.g., via a vehicle computer 110, is programmed to detect an impact but may not detect certain impacts, e.g., where an impact has occurred but is not detected because one or more restraint system components 125 of the vehicle 105 did not deploy as a result of the impact. For example, the vehicle computer 110 can receive data, e.g., from one or more sensors 115, indicating deployment of one or more restraint systems of the vehicle 105. In the case that one or more restraint systems are not activated, the vehicle computer 110 may not detect an impact to the vehicle. That is, the vehicle computer 110 may experience an impact but may not detect the impact because a restraint component 125 was not activated. Advantageously, the infrastructure element 140 can detect an impact to the vehicle 105 and report the impact to the vehicle 105 even when a restraint component 125 was not activated.

The vehicle 105 includes a vehicle computer 110, sensors 115, actuators 120, vehicle components 125, and a vehicle communications bus 130. Via a network 135, the communications bus 130 allows the vehicle computer 110 to communicate with other vehicles and/or one or more infrastructure elements 140.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle communications network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 106, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle computer 110 is programmed to receive data from one or more sensors 115, e.g., via the vehicle network. For example, the data may include a location of the vehicle 105. Location data may be in a known form, e.g., geo-coordinates such as latitude and longitude coordinates obtained via a navigation system, as is known, that uses the Global Positioning System (GPS). Additionally, or alternatively, the data can include a position of an object, e.g., another vehicle, a pole, a curb, a bicycle, etc., relative to the vehicle 105. As one example, the data may be image data of objects around the vehicle 105. Image data is digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the objects around the vehicle 105.

The vehicle computer 110 may be programmed to determine a distance between an object and the vehicle 105 based on the sensor data 115. For example, the vehicle computer 110 can analyze the sensor data 115 to determine the distance between the object and the vehicle 105. Additionally, the vehicle computer 110 can compare the distance to a distance threshold, e.g., stored in a memory of the vehicle computer 110. The distance threshold is a specified distance between the object and the vehicle 105, below which the object and the vehicle can be deemed to have experienced or predicted to experience an impact by one another. The distance threshold can be determined based on, e.g., empirical testing and/or simulation to avoid an impact with the object based on maneuvering capabilities of the vehicle 105. In the case that the distance between the object and the vehicle is below the distance threshold, the vehicle computer 110 can predict an impact between the object and the vehicle 105. In the case that the distance between the object and the vehicle 105 is above the distance threshold, the vehicle computer 110 can predict no impact between the object and the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, one or more passive restraint systems (e.g., airbags), a movable seat, etc.

The vehicle computer 110 may be programmed to determine an operability of the vehicle 105. That is, the vehicle computer 110 determines whether the vehicle 105 is operable or inoperable. For example, the vehicle computer 110 may be programmed to actuate one or more vehicle components 125, e.g., a propulsion component, a steering component, etc., to move the vehicle 105. In the case that the vehicle 105 does not move upon actuation of the vehicle components 125, the vehicle computer 110 determines that the vehicle 105 is inoperable. In the case that the vehicle 105 moves upon actuation of the vehicle components 125, the vehicle computer 110 determines the vehicle 105 is operable.

In addition, the vehicle computer 110 may be configured for communicating via a vehicle-to-vehicle communication bus 130 or interface with devices outside of the vehicle 105, e.g., through a vehicle-to-vehicle (V2V) or vehicle-to-infrastructure (V2X) wireless communications to another vehicle, and/or to other computers (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the infrastructure element 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications bus 150 and computer 155 can be housed, mounted, stored, and/or contained, and powered, etc. One infrastructure element 140 is shown in FIG. 1 for ease of illustration, but the system 100 could and likely would include tens, hundreds, or thousands of infrastructure elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each infrastructure sensor 145 is mounted to the infrastructure element 140 so as to have a substantially unmoving and unchanging field of view.

Infrastructure sensors 145 thus provide field of views in contrast to vehicle 105 sensors 115 in a number of advantageous respects. First, because infrastructure sensors 145 have a substantially constant field of view, determinations of vehicle 105 and object locations can be accomplished with fewer and simpler processing resources than if movement of the infrastructure sensors 145 also had to be accounted for. Further, the infrastructure sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, infrastructure sensors 145 can communicate with the infrastructure element 140 computer 155 via a wired connection, whereas vehicles 105 typically can communicates with infrastructure elements 140 only wirelessly, or only at very limited times when a wired connection is available. Wired communications are more reliable and can be faster than wireless communications such as vehicle-to-infrastructure communications or the like.

The communications bus 150 and computer 155 typically have features in common with the vehicle computer 110 and vehicle communications bus 130, and therefore will not be described further to avoid redundancy. Although not shown for ease of illustration, the infrastructure element 140 also includes a power source such as a battery, solar power cells, and/or a connection to a power grid.

The infrastructure computer 155 is programmed to detect an impact to the vehicle 105. For example, a detection by the infrastructure computer 155 of an impact to a vehicle 105 can be determined by data from infrastructure sensor(s) 145 or the vehicle 105 detecting an object within the distance threshold of the vehicle 105. For example, as described above, the vehicle computer 110 can determine an object is within the distance threshold of the vehicle 105 based on sensor 115 data. In such an example, the vehicle computer 110 can then transmit the sensor 115 data to the infrastructure computer 155. Alternatively, the infrastructure computer 155 can receive data, e.g., image data, from the infrastructure sensors 145 indicating a position of an object relative to the vehicle 105. In this situation, the infrastructure computer 155 can determine a distance between the object and the vehicle 105 and compare the distance to the distance threshold, e.g., stored in the memory of the infrastructure computer 155. In the case that the distance is below the distance threshold, the infrastructure computer 155 determines an impact to the vehicle 105. In the case that the distance is above the distance threshold, the infrastructure computer 155 determines no impact to the vehicle.

As another example, a detection by the infrastructure computer 155 of the impact to the vehicle 105 can be determined by data from infrastructure sensor(s) 145 detecting an anomaly on an exterior, e.g., a body panel, a window, a tire, etc., of the vehicle 105. For example, the infrastructure sensors 145 can transmit image data of the vehicle 105 to the infrastructure computer 155. The infrastructure computer 155 can then, e.g., using pattern recognition or image analysis techniques, analyze the image data to detect an anomaly, e.g., scratches, dents, cracks, punctures, etc., on the exterior of the vehicle 105. In the case that the infrastructure computer 155 detects an anomaly on the exterior of the vehicle 105, the infrastructure computer 155 determines an impact to the vehicle 105. In the case that the infrastructure computer 155 does not detect an anomaly on the exterior of the vehicle 105, the infrastructure computer 155 determines no impact to the vehicle 105.

As another example, a detection by the infrastructure computer 155 of the impact to the vehicle 105 can be determined by data received from a second vehicle 106, e.g., via the network 135. For example, the second vehicle 106 may be operating nearby the vehicle 105 such that sensors 115 of the second vehicle 106 may detect the vehicle 105. In these circumstances, the second vehicle 106, e.g., via a vehicle computer, may transmit sensor 115 data to the infrastructure computer 155. The data from the second vehicle 106 may indicate one of an object within the distance threshold of the vehicle 105 or an anomaly on an exterior of the vehicle 105.

As another example, a detection by the infrastructure computer 155 of the impact to the vehicle 105 can be determined by data received from a user device 160. The user device 160 can be a conventional computing device, i.e., including one or more processors and one or more memories, programmed to provide operations such as disclosed herein. The user device 160 can be a portable device. A portable device can be any one of a variety of computers that can be used while carried by a person, e.g., a smartphone, a tablet, a personal digital assistant, a smart watch, etc. The user device 160 receives data specified by a user, e.g., via a user interface. That is, a user inputs data to the user device 160. The data may identify an impact to the vehicle 105 and specify one or more conditions of the impact, e.g., a side of the vehicle 105 was impacted, an impacted object, a presence or absence of anomalies to the exterior of the vehicle 105, etc. Upon receiving data input from the user, the user device 160 can transmit the specified data to the infrastructure computer 155, e.g., via the network 135.

The infrastructure computer 155 is programmed to verify the impact. As described above, the infrastructure computer 155 detects an impact based on data received from one of infrastructure sensors 145, the vehicle 105, a second vehicle 106, or the user device 160. The infrastructure computer 155 verifies the impact based on data received from another of the infrastructure sensors 145, the vehicle 105, a second vehicle 106, or the user device 160. That is, the impact is verified when data from at least two of the infrastructure sensors 145, the vehicle 105, a second vehicle 106, or the user device 160 indicate an impact to the vehicle 105, and the impact is unverified when data from at most one of the infrastructure sensors 145, the vehicle 105, a second vehicle 106, or the user device 160 indicate an impact to the vehicle 105.

For example, the infrastructure computer 155 may verify the impact based on data received from the infrastructure sensors 145 (e.g., when the infrastructure computer 155 detects the impact based on data received from one of the vehicle 105, the user device 160, or a second vehicle 106). In such an example, the infrastructure computer 155 can analyze the data received from the infrastructure sensors 145 to determine whether the data verifies the impact, e.g., an object within the distance threshold, an anomaly on an exterior of the vehicle 105, etc. In the case that the data received from the infrastructure sensors 145 verifies the impact, the infrastructure computer 155 determines the impact is verified. Conversely, in the case that the data received from the infrastructure sensors 145 does not verify the impact, the infrastructure computer 155 determines the impact is unverified.

As another example, the infrastructure computer 155 may verify the impact based on data received from the user device 160 (e.g., when the infrastructure computer 155 detects the impact based on data received from one of the vehicle 105, infrastructure sensors 145, or a second vehicle 106). In such an example, the infrastructure computer 155 can analyze the data received from the user device 160 to determine whether the data verifies the impact, e.g., a user input specifies an impact. In the case that the data received from the user device 160 verifies the impact, the infrastructure computer 155 determines the impact is verified. Conversely, in the case that the data received from the user device 160 does not verify the impact, the infrastructure computer 155 determines the impact is unverified.

As another example, the infrastructure computer 155 may verify the impact based on data received from a second vehicle 106 (e.g., when the infrastructure computer 155 detects the impact based on data received from one of the vehicle 105, infrastructure sensors 145, or the user device 160). In such an example, the infrastructure computer 155 can analyze the data received from the second vehicle 106 to determine whether the data verifies the impact, e.g., an object within the distance threshold, an anomaly on an exterior of the vehicle 105, etc. In the case that the data received from the second vehicle 106 verifies the impact, the infrastructure computer 155 determines the impact is verified. Conversely, in the case that the data received from the second vehicle 106 does not verify the impact, the infrastructure computer 155 determines the impact is unverified.

As yet another example, the infrastructure computer 155 may verify the impact based on data received from the vehicle (e.g., when the infrastructure computer 155 detects the impact based on data received from one of a second vehicle 106, infrastructure sensors 145, or the user device 160). In such an example, the infrastructure computer 155 can analyze the data received from the vehicle 105 to determine whether the data verifies the impact, e.g., an object within the distance threshold, an anomaly on an exterior of the vehicle 105, etc. In the case that the data received from the vehicle 105 verifies the impact, the infrastructure computer 155 determines the impact is verified. Conversely, in the case that the data received from the vehicle 105 does not verify the impact, the infrastructure computer 155 determines the impact is unverified.

As another example, the infrastructure computer 155 can determine the verification of the impact using conventional image-recognition techniques, e.g., a machine learning program such as a convolutional neural network programmed to accept data from at least two of the infrastructure sensors 145, the vehicle 105, a second vehicle 106, or the user device 160 as input, and output a verification of the impact. The data from at least two of the infrastructure sensors 145, the vehicle 105, a second vehicle 106, or the user device 160 may be image data, e.g., indicating at least one of an object within a distance of the vehicle 105 and an anomaly on an exterior of the vehicle 105. For example, data from the infrastructure sensors 145 and the vehicle 105, e.g., sensor 115 data, can be input into the machine learning program. A convolutional neural network includes a series of layers, with each layer using the previous layer as input. Each layer contains a plurality of neurons that each receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential verification, i.e., a verified impact and an unverified impact, and the final output is the verification with the highest score.

The infrastructure computer 155 may store, e.g., in a memory, one or more predetermined locations at which the vehicle 105 can receive assistance, e.g., from a second vehicle 106, a service center, etc. The predetermined locations may include, e.g., locations on a road outside active lanes of traffic, service center locations, dealership locations, etc. In the case that the infrastructure computer 155 stores more than one predetermined location, the infrastructure computer 155 may query the stored predetermined locations and select a predetermined location based on one or more parameters. The parameters may include a location of the vehicle 105, a type of anomaly, e.g., a bumper dent, a window crack, etc., on the exterior of the vehicle 105, a type of vehicle 105, e.g., car, truck, bus, etc., a time of day, traffic flow, available locations on the road outside active lanes of traffic, operability of the vehicle 105, etc. In such an example, the infrastructure computer 155 can then transmit location data of the selected predetermined location to the vehicle 105. Location data may be in a conventional form, e.g., geo-coordinates such as latitude and longitude coordinates obtained via a navigation system, as is known, that uses the Global Positioning System (GPS). The infrastructure computer 155 may transmit a route or path for the vehicle 105 to operate along to reach the predetermined location, e.g., in a same or different transmission as the message.

The infrastructure computer 155 may be programmed to determine the operability of the vehicle 105 based on data received from the infrastructure sensors 145 indicating movement of the vehicle 105. In the case that the infrastructure computer 155 determines that the vehicle 105 does not satisfy normal operation, the infrastructure computer 155 transmits a message to the vehicle computer 110 instructing the vehicle computer 110 to stop the vehicle. In this context, "normal operation" means the vehicle 105 is operating within predetermined parameters, i.e., a specified range or range of values, e.g., acceleration, braking, steering parameters, etc., e.g., as determined by empirical testing and/or simulation, based on operation on conventional roads. Additionally, the infrastructure computer 155 transmits a message to a second vehicle 106 indicating a location of the vehicle 105. Further, the infrastructure computer 155 transmits the message to the second vehicle 106 indicating the location of the vehicle 105 based on the response from the vehicle computer 110 indicating the vehicle 105 is inoperable. The message requests that the second vehicle 106 provide assistance to the vehicle 105 at the location. In the case that the infrastructure computer 155 determines that the vehicle 105 is operating normally, the infrastructure computer 155 transmits a message to the vehicle computer 110 to continue operation.

Figure 2:
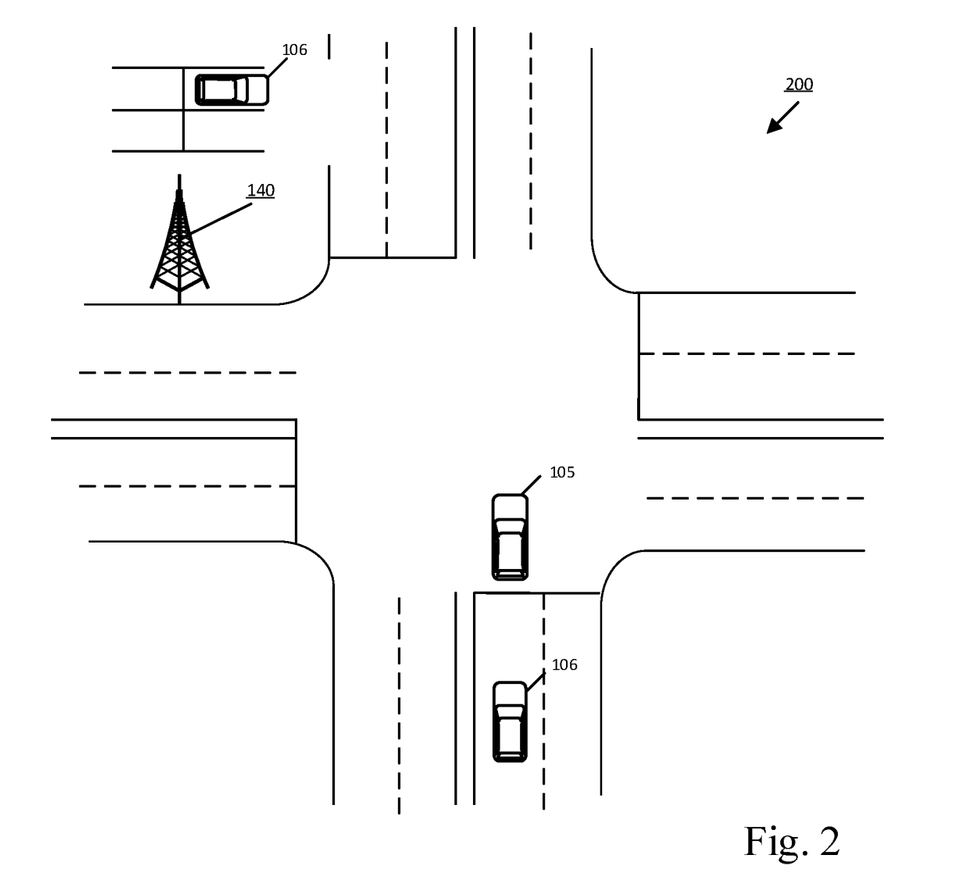
FIG. 2 is a diagram illustrating an example traffic scene in which the system of FIG. 1 could be implemented.

Turning to FIG. 2, an infrastructure element 140 can be provided to monitor defined area 200 around the infrastructure element 140. For example, the defined area 200 could be an area that is proximate to the infrastructure element 140. In the present context, "proximate" means that the area 200 is defined by a field of view of one or more infrastructure element 140 sensors 145. The defined area 200 could alternatively be an area defined by a radius around the infrastructure element 140 or some other distance or set of distances relative to the infrastructure element 140.

In addition to vehicles 105, 106 an area 200 can include other objects, e.g., a pedestrian object, a bicycle object, a pole object etc., i.e., an area 200 could alternatively or additionally include many other objects, e.g., bumps, potholes, curbs, berms, fallen trees, litter, construction barriers or cones, etc. Objects can be specified as being located according to a coordinate system for an area maintained by the vehicle computer 110 and/or infrastructure 140 computer 155, e.g., according to a Cartesian coordinate system or the like specifying coordinates in the area 200. Additionally, data about an object could specify characteristics of a hazard or object in a sub-area such as on or near a road, e.g., a height, a width, etc.

Figure 3:
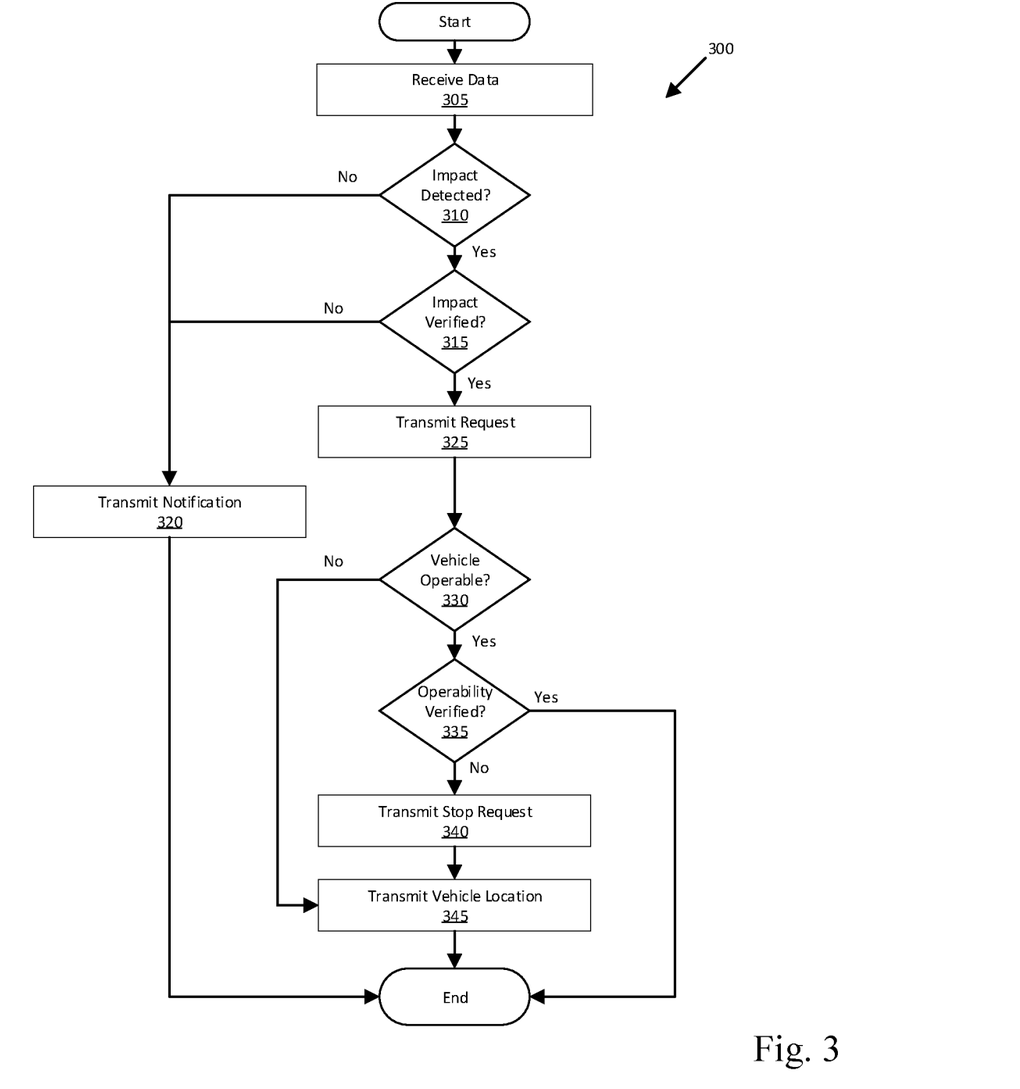
FIG. 3 is a flowchart of an exemplary process for detecting a vehicle impact.

FIG. 3 is a diagram of an example process 300 for detecting an impact to a vehicle 105. The process 300 begins in a block 305.

In the block 305, the infrastructure computer 155 receives data from at least one of the infrastructure sensor(s) 145, the vehicle 105, the user device 160, and a second vehicle 106. For example, the infrastructure computer 155 may receive data via the network 135, e.g., from the vehicles 105, 106 and/or the user device 160, or via wired communication, e.g., from the infrastructure sensor(s) 145. The infrastructure computer 155 may, for example, request data from a vehicle 105, 106 upon establishing communication with the vehicle 105, 106 via the network 135. As another example, the user device 160 may transmit data to the infrastructure computer 155 upon receiving a user input. The data may be, for example, image data indicating objects around the vehicle 105 and/or an appearance of the exterior of the vehicle 105. The process continues in a block 310.

In the block 310, the infrastructure computer 155 determines whether at least one of the infrastructure sensor(s) 145, the vehicle 105, the user device 160, and a second vehicle 106 detects an impact to the vehicle 105. For example, the infrastructure computer 155 analyzes, e.g., using pattern recognition or image analysis techniques, the data received from at least one of the infrastructure sensor(s) 145, the vehicle 105, the user device 160, and a second vehicle 106 to detect at least one of (a) an object within the threshold distance of the vehicle 105 or (b) an anomaly, e.g., a scratch, a dent, a crack, etc., to the exterior of the vehicle 105. As another example, received data, e.g., from the user device 160, may specify an impact to the vehicle 105, as discussed above. In the case that the infrastructure computer 155 determines an impact to the vehicle 105, the process 300 continues in the block 315. Otherwise, the process 300 continues in a block 320.

In the block 315, the infrastructure computer 155 verifies the impact to the vehicle 105 105 based on data from another of the infrastructure sensor(s) 145, the vehicle 105, the user device 160, and a second vehicle 106. The infrastructure computer 155 determines the impact is verified when at least two of the infrastructure sensor(s) 145, the vehicle 105, the user device 160, and a second vehicle 106 detect the impact to the vehicle 105. For example, the infrastructure computer 155 analyzes the data received from another of the infrastructure sensor(s) 145, the vehicle 105, the user device 160, and a second vehicle 106 to detect at least one of (a) an object within the threshold distance of the vehicle 105 or (b) an anomaly, e.g., a scratch, a dent, a crack, etc., to the exterior of the vehicle 105. In the case that the infrastructure computer 155 verifies the impact, the process 300 continues in a block 325. Otherwise, the process 300 continues in the block 320.

In the block 320, the infrastructure computer 155 transmits a notification message to the vehicle computer 110. The infrastructure computer 155 may transmit the notification message based on (a) an impact not being detected or (b) the impact being unverified. The message instructs the vehicle computer 110 to continue a current operation. Additionally, the notification specifies that the infrastructure computer 155 did not detect and/or verify an impact to the vehicle 105. Following the block 320, the process 300 ends.

In the block 325, the infrastructure computer 155 transmits a request message to the vehicle computer 110. The request message requests the vehicle computer 110 to operate the vehicle 105 to a predetermined location, e.g., to receive assistance, maintenance, and/or repairs. The request includes location data of the predetermined location and may include a route from a location of the vehicle 105 to the predetermined location. The infrastructure computer 155 selects the predetermined location based on one or more parameters, as discussed above. Additionally, the infrastructure computer 155 transmits an informational message to the vehicle computer 110, e.g., via the network 135, indicating the impact to the vehicle 105, and/or may include this information in the request message. The process 300 continues in a block 330.

In the block 330, the infrastructure computer 155 determines an operability of the vehicle 105 based on a response message from the vehicle computer 110. For example, the vehicle computer 110 may determine an operability of the vehicle 105 based on movement of the vehicle 105. For example, the vehicle computer 110 may be programmed to actuate one or more vehicle components 125 to operate the vehicle 105 to the predetermined location. In the case that the vehicle 105 moves upon actuation of the vehicle components 125, the vehicle computer 110 determines the vehicle 105 is operable. Conversely, in the case that the vehicle 105 does not move upon actuation of the vehicle components 125, the vehicle computer 110 determines the vehicle 105 is inoperable. As another example, the vehicle computer 110 may determine the operability of the vehicle 105 based on, e.g., sensor 115 data (e.g., comparing a tire pressure to a threshold, an engine temperature to a threshold, etc.), a diagnostic trouble code (DTC) or the like, a message from a user device 160, etc. The vehicle computer 110 then transmits the response message indicating the operability of the vehicle 105 to the infrastructure computer 155. In the case that the response indicates the vehicle 105 is operable, the infrastructure computer 155 determines the vehicle 105 is operable, and the process 300 continues in a block 335. Otherwise, the process 300 continues in a block 345.

In the block 335, upon receiving a response message indicating the vehicle 105 is operable, the infrastructure computer 155 verifies the operability of the vehicle 105. For example, the infrastructure computer 155 may receive data from the infrastructure sensor(s) 145 indicating movement of the vehicle 105. In the case that the vehicle 105 movement satisfies normal operation (as described above), the infrastructure computer 155 verifies the vehicle 105 is operable. Conversely, in the case that the vehicle 105 movement does not satisfy normal operation, the infrastructure computer 155 determines the vehicle 105 is inoperable. When the infrastructure computer 155 determines the vehicle 105 is inoperable, the process 300 continues in a block 340. Otherwise, the process 300 ends.

In the block 340, the infrastructure computer 155 transmits an instruction message to the vehicle computer 110. The instruction message instructs the vehicle computer 110 to stop operating the vehicle 105 to the predetermined location. For example, the instruction message may specify that the vehicle computer 110 actuate a brake component 125 and stop the vehicle 105 at a current location. The process 300 continues in a block 345.

In the block 345, the infrastructure computer 155 transmits a message including the location of the vehicle 105 to a second vehicle 106, e.g., via the network 135. The infrastructure computer 155 may determine the location of the vehicle 105 based on data received from, e.g., the infrastructure sensor(s) 145, the vehicle 105, a user device 160, etc. For example, the infrastructure sensor(s) 145 may detect a location of the vehicle 105 relative to the infrastructure sensor(s) 145. The infrastructure computer 155 receives the data from the infrastructure sensor(s) 145 indicating the location of the vehicle 105. The infrastructure computer 155 can then determine the location of the vehicle 105 based on the location of the infrastructure sensor(s) 145. For example, the infrastructure computer 155 can determine a distance and/or direction from the infrastructure sensor(s) 145 to the vehicle 105, e.g., by using image analysis techniques. As another example, the infrastructure computer 155 can determine the location of the vehicle 105 in an infrastructure coordinate system (i.e., a cartesian or polar coordinate system local to the infrastructure element 140, e.g., having the element 140 as a point of origin) translated to GPS where GPS coordinates of the infrastructure sensor(s) 145 are known. Alternatively, the vehicle computer 110 can transmit a message including a location of the vehicle 105 to the infrastructure computer 155, e.g., via the network 135, in response to the instruction. The second vehicle 106 can provide assistance to the vehicle 105 at the location of the vehicle 105. Following the block 345, the process 300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
    detect an impact to a vehicle based on data received from one of (a) one or more infrastructure sensors included in an infrastructure element or (b) the vehicle;
    determine a verification of the impact by determining that data received from the other of the infrastructure sensors or the vehicle (a) detects the impact and is verified or (b) does not detect the impact and is unverified; and
    then transmit a message to the vehicle including the verification of the impact and one of (a) a request to operate to a predetermined location based on the impact being verified or (b) a notification to continue a current operation based on the impact being unverified.

2. The system of claim 1, wherein the instructions further include instructions to, upon receiving a response from the vehicle indicating the vehicle is inoperable, transmit a message indicating a location of the vehicle to a second vehicle.

3. The system of claim 1, wherein the instructions further include instructions to, upon receiving a response from the vehicle indicating the vehicle is operable, determine the vehicle is one of operable or inoperable based on data received from the infrastructure sensors indicating movement of the vehicle.

4. The system of claim 3, wherein the instructions further include instructions to, upon determining the vehicle is inoperable, transmit a message indicating a location of the vehicle to a second vehicle.

5. The system of claim 1, wherein detecting the impact is determined by data from one of the infrastructure sensors or the vehicle detecting an object within a distance of the vehicle.

6. The system of claim 1, wherein detecting the impact is determined by data from the infrastructure sensors detecting an anomaly on an exterior of the vehicle.

7. The system of claim 1, wherein the instructions further include instructions to determine the verification of the impact further by determining data received from a user device (a) detects the impact and is verified or (b) does not detect the impact and is unverified.

8. The system of claim 1, wherein the instructions further include instructions to determine the verification of the impact further by determining data received from a second vehicle (a) detects the impact and is verified or (b) does not detect the impact and is unverified.

9. The system of claim 1, wherein determining the verification of the impact includes obtaining the verification as output from a neural network.

10. The system of claim 9, wherein the instructions further include instructions to input the data received from infrastructure sensors and the vehicle into the neural network.

11. The system of claim 10, wherein the data is image data indicating at least one of an object within a distance of the vehicle and an anomaly on an exterior of the vehicle.

12. A method comprising:
   detecting an impact to a vehicle based on data received from one of (a) one or more infrastructure sensors included in an infrastructure element or (b) the vehicle;
   determining a verification of the impact by determining that data received from the other of the infrastructure sensors or the vehicle (a) detects the impact and is verified or (b) does not detect the impact and is unverified; and
   then transmitting a message to the vehicle including the verification of the impact and one of (a) a request to operate to a predetermined location based on the impact being verified or (b) a notification to continue a current operation based on the impact being unverified.

13. The method of claim 12, further comprising, upon receiving a response from the vehicle indicating the vehicle is inoperable, transmitting a message indicating a location of the vehicle to a second vehicle.

14. The method of claim 12, further comprising, upon receiving a response from the vehicle indicating the vehicle is operable, determining the vehicle is one of operable or inoperable based on data received from the infrastructure sensors indicating movement of the vehicle.

15. The method of claim 14, further comprising, upon determining the vehicle is inoperable, transmitting a message indicating a location of the vehicle to a second vehicle.

16. The method of claim 12, wherein detecting the impact is determined by data from one of the infrastructure sensors or the vehicle detecting an object within a distance of the vehicle.

17. The method of claim 12, wherein detecting the impact is determined by data from the infrastructure sensors detecting an anomaly on an exterior of the vehicle.

18. The method of claim 12, wherein determining the verification of the impact includes obtaining the verification as output from a neural network.

19. The method of claim 18, further comprising inputting the data received from infrastructure sensors and the vehicle into the neural network.

20. The method of claim 19, wherein the data is image data indicating at least one of an object within a distance of the vehicle and an anomaly on an exterior of the vehicle.

\* \* \* \* \*